No. 840,130. PATENTED JAN. 1, 1907.
J. C. HYLTON.
COLLAPSIBLE STAND FOR WATER COOLERS.
APPLICATION FILED AUG. 22, 1906.
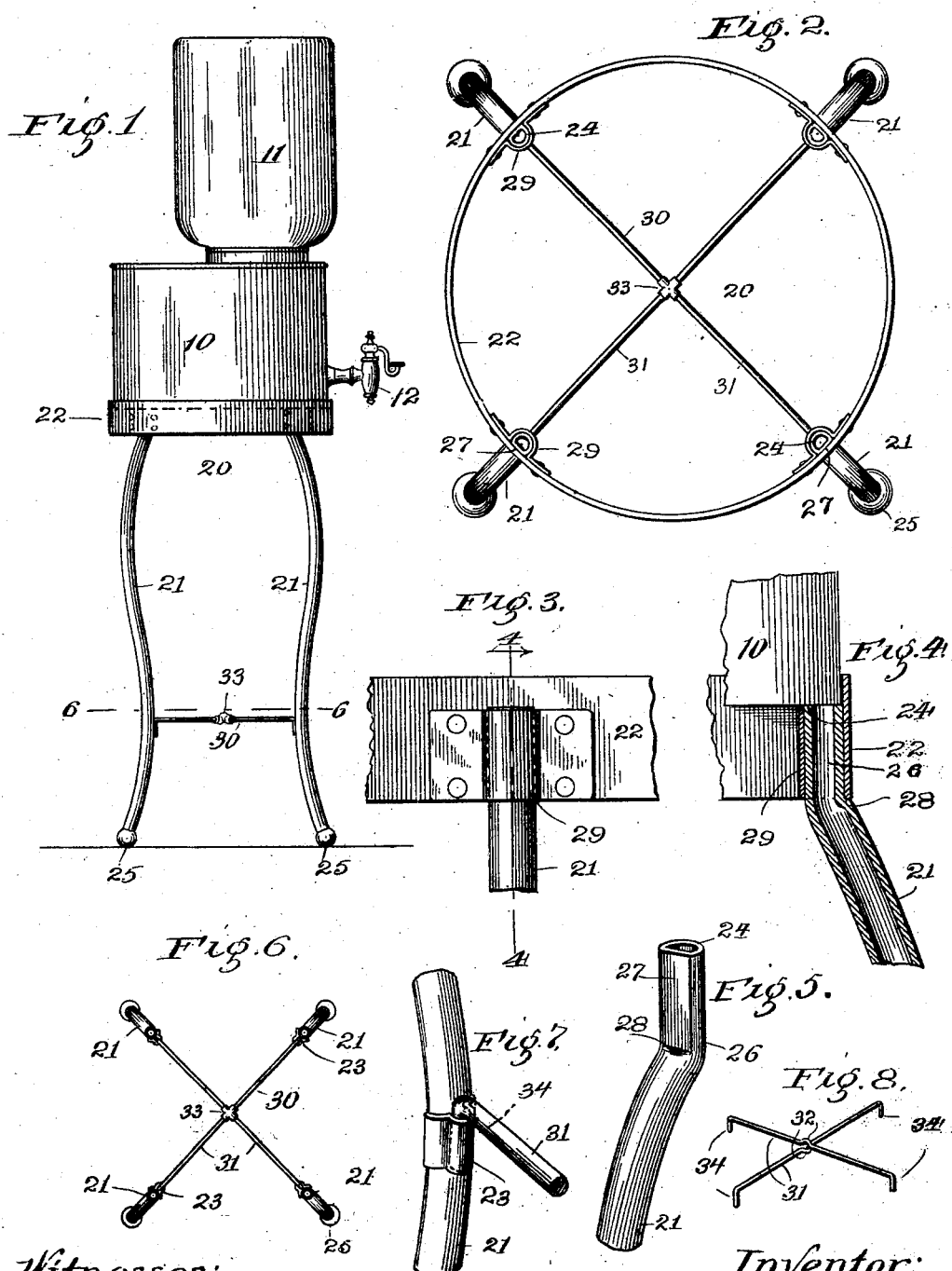
Witnesses:
Wm. P. Bond
Herbert H. Wohl
Inventor:
John C. Hylton,
by Charles O. Sherry,
Atty.

UNITED STATES PATENT OFFICE.

JOHN C. HYLTON, OF CHICAGO, ILLINOIS.

COLLAPSIBLE STAND FOR WATER-COOLERS.

No. 840,130.  Specification of Letters Patent.  Patented Jan. 1, 1907.

Application filed August 22, 1906. Serial No. 331,568.

*To all whom it may concern:*

Be it known that I, JOHN C. HYLTON, a citizen of the United States, and a resident of Chicago, in the county of Cook and State of Illinois, have invented certain new and useful Improvements in Collapsible Stands for Water-Coolers, of which the following is a full, clear, and exact description.

My invention relates to certain new and useful improvements in collapsible stands for water-coolers, the object being to provide a cheap, simple, and substantial stand which may be readily assembled for use or taken apart for shipping purposes.

To such end the invention consists in certain novel features of construction, a description of which will be found in the following specification and the essential features more definitely pointed out in the claims appended hereto.

The invention is clearly illustrated in the drawings furnished herewith, in which—

Figure 1 is a side view of a stand with the ordinary water-cooler supported thereon. Fig. 2 is a plan view of the stand alone. Fig. 3 is a fragmental side view of a connecting-ring and one of the legs. Fig. 4 is a section on the line 4 4 of Fig. 3. Fig. 5 is a perspective view of the upper portion of one of the legs. Fig. 6 is a horizontal section on the line 6 6 of Fig. 1. Fig. 7 is a perspective view of a fragment of one of the legs, illustrating the manner of connecting the cross-brace thereto; and Fig. 8 is a perspective view of two members of the cross-brace alone.

Referring to the drawings, 10 represents the ordinary tank, and 11 the water-bottle, of a water-cooler now in common use, the water being drawn off through a faucet 12, which connects with the water-bottle in any suitable manner. These parts are well known and require no detail description. The stand 20 in general consists of a plurality of legs 21, removably connected to a ring 22 and braced near their lower ends by a cross-brace 30. The inner diameter of the ring 22 is practically that of the diameter of the tank 10, and said tank rests directly upon the upper ends 24 of the legs 21, thereby removing any strain whatever from the ring 22. The legs 21 are preferably given the shape of a reverse curve for the sake of appearance, and feet 25, preferably consisting of spherical knobs, are secured to the lower ends of the legs. The upper end of each leg contains a vertical portion 26, the outer face of which is flattened at 27, leaving a shoulder 28 in the outer face of the leg. Clips 29 are riveted to the ring 22 upon its inner face, and the vertical portions 26 of the legs are inserted in the clips 29 with the flat portions 27 contiguous with the inner face of the ring 22, the ring resting upon the shoulders 28 of the legs. The flat portion engaging with the ring prevents any side sway of the leg, and the legs are further reinforced by the cross-brace 30. The cross-brace consists, preferably, of two rods 31, arranged at right angles with each other, each one being preferably formed with a kink 32 at its central point to prevent movement of one rod with respect to the other, and this central portion of the brace may be further reinforced by clip 33, the ends of which are bent around the rods. The ends of the rods have downturned hooks 34, which rest in clips 23, that are brazed or otherwise secured to the legs 21. The ring 22 is somewhat wider than the distance between the shoulder 28 and the end 24 of the legs, so that the ring extends upward a short distance from the top of the legs in order that it may surround and retain the tank in place upon the legs.

When set up for use, the stand forms a perfectly rigid structure, the flattened faces 27 serving to hold the legs against lateral sway and the removable cross-brace serving to brace the lower ends of the legs. The tank resting directly upon the legs makes it possible to use a very light ring, which, if desired, may be thin and flexible or of open-work or scrollwork pattern serving merely to position the upper ends of the legs and to retain the tank in place. The structure is easily knocked down for shipping purposes by removing the brace 30 from the legs and drawing the legs out of the clips in the ring 22. In shipping, a number of these rings may be placed beside one another and a set of legs for each ring may be thrust through all of the rings, so that a number of stands may be caused to occupy the same space as is occupied by a complete stand when set up.

I claim as new and desire to secure by Letters Patent—

1. In a device of the class described, the combination with a plurality of supporting-legs, of a connecting-ring removably secured thereto, and a tank fitting in said ring and resting directly upon the upper ends of the legs.

2. In a device of the class described, the combination with a plurality of legs, the upper ends of which are substantially vertical and contain flat outer faces, of a connecting-ring, and clips secured to said ring and encircling the upper ends of the legs, the flat faces of the legs engaging the inner face of the ring to prevent lateral sway of the legs.

3. In a device of the class described, the combination with a plurality of legs having substantially vertical portions at their upper ends, the outer faces of which contain a flat vertical portion, and a horizontal shoulder, of a connecting-ring resting upon said shoulders with the inner face of the ring contiguous with the flat faces of the legs and clips removably connecting the legs thereto.

4. In a device of the class described, the combination with a plurality of tubular legs, and a cross-brace removably secured thereto near the lower ends thereof, said legs being formed with substantially vertical portions having flat outer faces and horizontal shoulders, of a connecting-ring resting upon said shoulders with the inner face of the ring contiguous with the flat faces of the legs, clips removably connecting the legs to the ring and a water-tank fitting within the ring and resting directly upon the upper ends of the legs.

JOHN C. HYLTON.

Witnesses:
CHAS. O. SHERVEY,
WM. P. BOND.